(12) United States Patent
Olsen et al.

(10) Patent No.: US 9,609,077 B1
(45) Date of Patent: Mar. 28, 2017

(54) FORWARDING CONTENT ON A CLIENT BASED ON A REQUEST

(75) Inventors: Gregory P. Olsen, Lindon, UT (US); Paul Byron Hillyard, Lindon, UT (US)

(73) Assignee: Crimson Corporation, Dover, DE (US)

( * ) Notice: Subject to any disclaimer, the term of this patent is extended or adjusted under 35 U.S.C. 154(b) by 298 days.

(21) Appl. No.: 13/484,094

(22) Filed: May 30, 2012

(51) Int. Cl.
*G06F 15/16* (2006.01)
*H04L 29/08* (2006.01)

(52) U.S. Cl.
CPC ............... *H04L 67/2814* (2013.01)

(58) Field of Classification Search
CPC ....... H04L 45/00; H04L 45/02; H04L 45/306; H04L 63/126; H04L 67/02; H04L 67/28; H04L 67/1014; H04L 69/22; H04L 67/2842; H04L 67/289; H04L 67/2814
USPC .................................. 709/202, 219
See application file for complete search history.

(56) References Cited

U.S. PATENT DOCUMENTS

| | | | | |
|---|---|---|---|---|
| 6,097,882 | A * | 8/2000 | Mogul .......................... | 709/201 |
| 6,370,571 | B1 * | 4/2002 | Medin, Jr. .................... | 709/218 |
| 6,738,635 | B1 * | 5/2004 | Lewis et al. ................. | 455/466 |
| 7,035,248 | B2 * | 4/2006 | Wengrovitz .................. | 370/352 |
| 7,509,398 | B2 * | 3/2009 | Acharya et al. ............. | 709/219 |
| 7,631,084 | B2 * | 12/2009 | Thomas et al. ............... | 709/227 |
| 7,930,398 | B2 * | 4/2011 | Kawato ......................... | 709/226 |
| 2003/0009587 | A1 * | 1/2003 | Harrow et al. ............... | 709/238 |
| 2003/0158947 | A1 * | 8/2003 | Bloch et al. .................. | 709/227 |
| 2007/0005777 | A1 * | 1/2007 | Fremantle et al. ........... | 709/228 |
| 2008/0120412 | A1 * | 5/2008 | Icaza ...................... | H04L 67/16 709/225 |
| 2008/0155061 | A1 * | 6/2008 | Afergan et al. .............. | 709/218 |
| 2009/0117927 | A1 * | 5/2009 | Li et al. ........................ | 455/466 |
| 2009/0182843 | A1 * | 7/2009 | Hluchyj et al. .............. | 709/219 |
| 2012/0272245 | A1 * | 10/2012 | Ryman ......................... | 718/100 |

OTHER PUBLICATIONS

Rosenberg et al (SIP: Session Initiation Protocol), Jun. 2002, Network Working Group, Request for comment: 3261, Category: Standard Tracks, p. 1-269, Jun. 2002). http://www.rfc-editor.org/rfc/pdfrfc/rfc3261.txt.pdf.*

* cited by examiner

*Primary Examiner* — Christopher Biagini
(74) *Attorney, Agent, or Firm* — Austin Rapp & Hardman

(57) ABSTRACT

A computing device configured to forward a request is described. The computing device includes a processor and instructions stored in memory that is in electronic communication with the processor. The computing device receives a request. The computing device also identifies an agent module based on the request to obtain an identified agent module. The computing device further determines an administrative service based on the identified agent module. The computing device additionally forwards the request to the administrative service. The computing device also sends a reply to the identified agent module.

18 Claims, 10 Drawing Sheets

Routing Table 628

| Entry | Function Name 630 | Admin Service Name 632 | Agent Module 620 | Destination 634 | Load Capacity 636 |
|---|---|---|---|---|---|
| 1 | Patch A | | Patch Module | 204.246.148.156:1000 | 95% |
| 2 | Patch B | | Patch Module | 204.246.148.156:1001 | 20% |
| 3 | Inventory | | Inventory Module | 204.246.148.156:1000 | 2% |
| 4 | Downloader | | Patch Module | 204.246.148.160:1004 | Available |
| 5 | | wsremoteaccesscore | Remote Access Mod. | wsremoteaccesscore | Busy |
| 6 | Virus Scan | wsvulnerabilitycore | | 204.246.148.160:8445 | Available |
| 7 | Local Storage | | Patch Module | 192.168.0.227 | 300 GB Free |
| 8 | Remote Storage | | | 204.246.148.156:34561 | 20 GB Free |
| ... | ... | ... | ... | ... | ... |
| n | Function n | Admin Service n | Agent n | Destination n | Load Message n |

FIG. 6

FORWARDING CONTENT ON A CLIENT BASED ON A REQUEST

TECHNICAL FIELD

The present disclosure relates generally to computers and computer-related technology. More specifically, the present disclosure relates to forwarding content on a client based on a request.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On a network, one or more servers may provide data, services and/or may be responsible for managing other computers. A computer network may include hundreds or even thousands of computers.

Most companies have one or more computer networks and also make extensive use of the Internet. The productivity of employees often depends upon human computer interaction. Improvements in computers and software have been a force for bringing about great increases in business and industrial productivity as well as in the area of computer security.

As the use of computers has increased, so has the need to manage and update computers, especially in a controlled environment. Continual management of computers is one current challenge. For example, maintenance, monitoring and general life-cycle management become increasingly difficult as the number of devices on a network increases.

BRIEF DESCRIPTION OF THE DRAWINGS

FIG. 6 is a diagram illustrating one example of a routing table;

DETAILED DESCRIPTION

Figure 1:
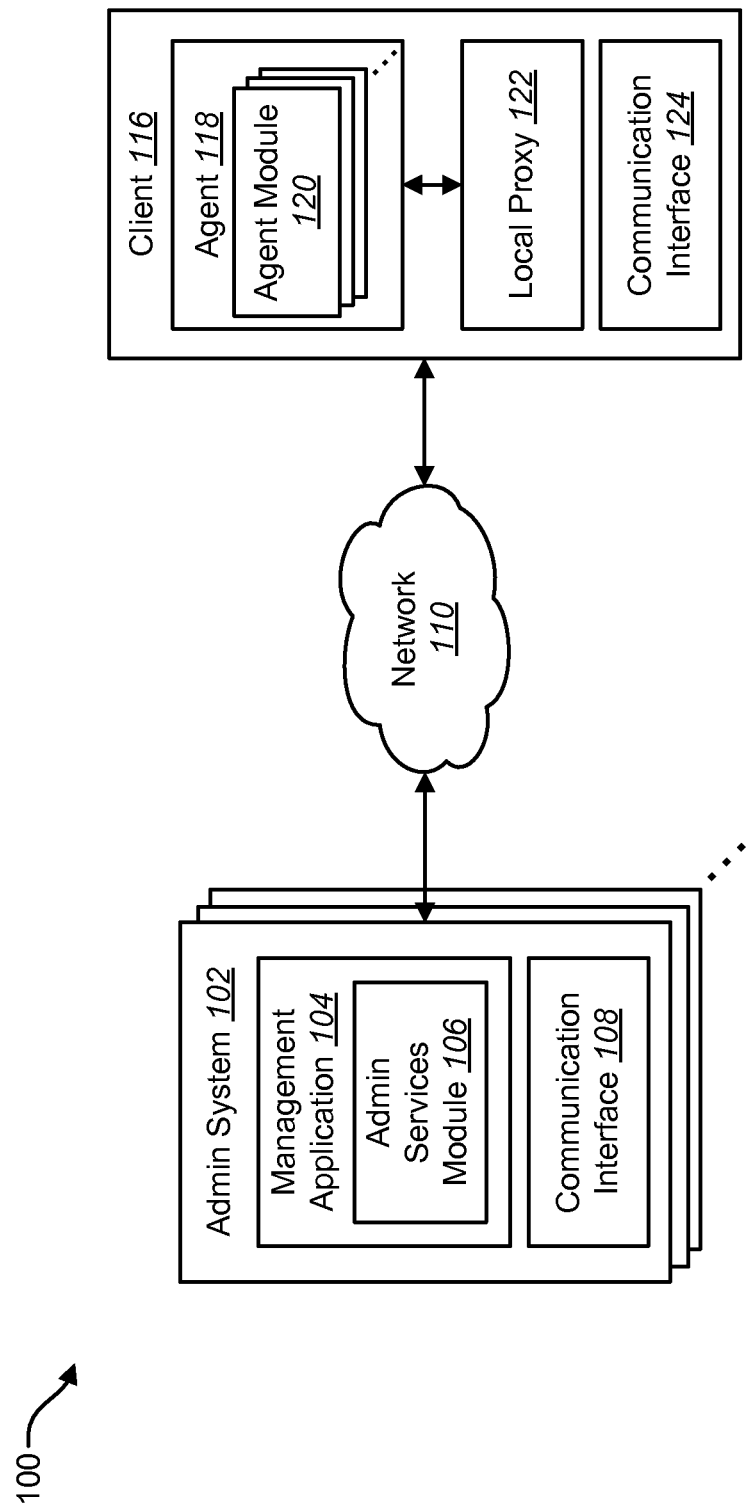
FIG. 1 is a block diagram illustrating one configuration of a system for forwarding content on a client based on a request.

A computing device configured to forward a request is described. The computing device includes a processor and executable instructions stored in memory that is in electronic communication with the processor. The computing device receives a request. The computing device also identifies an agent module based on the request to obtain an identified agent module. The computing device additionally determines an administrative service based on the identified agent module. The computing device further forwards the request to the administrative service. The computing device also sends a reply to the identified agent module.

Identifying the agent module and determining the administrative service may be performed by a service on the computing device. The service may be dynamically updated. The request may include a parameter that indicates the agent module sending the request. The parameter may be a user agent field.

The request may include a Uniform Resource Locator (URL). Forwarding the request may include sending data to the administrative service. Forwarding the request may also include sending the data to a storage device with instructions to later send the data to the administrative service. The computing device may also receive a plurality of requests.

A method for forwarding a request on a computing device is also described. The method includes receiving a request. The method also includes identifying an agent module based on the request to obtain an identified agent module. The method additionally includes determining an administrative service based on the identified agent module. The method further includes forwarding the request to the administrative service. The method also includes sending a reply to the identified agent module A non-transitory tangible computer-readable medium for forwarding a request is also described. The computer-readable medium includes instructions for receiving a request. The computer-readable medium also includes instructions for identifying an agent module based on the request to obtain an identified agent module. The computer-readable medium further includes instructions for determining an administrative service based on the identified agent module. The computer-readable medium additionally includes instructions for forwarding the request to the administrative service. The computer-readable medium also includes instructions for sending a reply to the identified agent module.

The systems and methods disclosed herein may allow for forwarding content on a client, such as a client computing device, based on a request from a local module. The systems and methods disclosed herein may use both hardware and/or software interfaces to forward content from a client to one or more administrative servers (e.g., cores) based one or more requests.

Managed networks are often composed of clients (e.g., managed nodes). These clients often have hardware and/or software components that communicate with an administrative system (e.g., core server). For example, each client may include an application that manages various agent modules, such as a software updater module, an inventory module, a remote access module, etc.

The administrative (admin) system may be responsible for the maintenance, monitoring and general life-cycle management of each client. On some networks, the admin system 102 may be divided into multiple devices (e.g., admin systems). For example, the admin systems may include peer or child computing devices that share management responsibilities of the managed network. Additionally, admin systems may be divided up according to tasks and services needing to be performed on the network, such as one admin system for software updates, another admin system for inventory records and another admin system for remote access.

Because multiple admin systems may be present on a network, the application on the client may be caused to send multiple requests on the network. For example, the inventory module on a client may be required to submit inventory data each day. In doing so, the inventory module may attempt to send that data to one admin system only to find that it sent the data to the software distribution admin system. This may lead to the data never arriving at its intended destinations, multiple sends being required and/or a host of other problems. Additionally, as the number of clients, agent modules and/or admin systems are increased on the network, these problems can compound rapidly and possibly lead to network failures.

The systems and methods disclosed herein may allow agent modules to communicate with one or multiple admin systems without requiring excessive overhead. In other words, the agent modules are not required to have an extensive knowledge regarding the one or more admin systems. The agent modules only send requests to a local proxy (e.g., proxy, proxy host, proxy router, etc.). In this manner, the local proxy takes care of knowing where to forward the request to. The systems and methods disclosed herein may also allow clients to send data to admin systems more efficiently. Furthermore, as agent modules and/or admin systems are added to the network, the network may be able to scale automatically without additional attention. Furthermore, having the local proxy intercept and directly process requests may improve network efficiency and relieve an overloaded admin system.

In some configurations, forwarding and/or routing content on a client based on a request may be beneficial. For example, a local proxy on the client could receive a request from a local module, such as the agent module and correctly route the request to the proper admin system. In this instance, the agent module only needs to send the request to the local proxy, regardless of which admin system the request may need to be sent to. In this way, unnecessary network congestion would be reduced. Additionally, the scalability of networks improves as additional admin systems may be added and/or replaced without additional modification to each agent module on each client.

In another configuration, the local proxy may identify the agent module that is making the request. In some cases, the local proxy may identify the requesting agent module based on the request. For example, if the remote access module made a request to update user preferences, the local proxy may identify the request as coming from the remote access module. Then, the local proxy may process and use this information to forward the request to the admin system(s) managing remote access services. Additionally, by knowing the agent module that sent the request, the local proxy may be able to send replies and confirmations to the requesting agent module.

In some configurations, the local proxy may use a Universal Resource Locator (URL) to determine the agent module making the request. For example, the URL in the request may include enough information to know which agent module made the request. Information such as the admin service name and/or function name within the request may be used to forward the request to the appropriate admin system. For instance, the local proxy may examine the URL to identify the location of the admin service request. Based on the request, the local proxy may determine the agent module that made the request and the proper admin system to forward the request to.

In other configurations, the local proxy may determine the agent module that sent a web request by looking at a parameter in the request. For example, the local proxy may look at a parameter in the HTTP (HyperText Transfer Protocol) header information of a request. The parameter may be a newly created parameter or a modification of an existing parameter. For example, the parameter may be the User Agent field defined by HTTP protocol. The User Agent field is generally used to tell a server the type of browser that is making the request. A parameter module in the application may include package information in the request. For example, the parameter module may use cURL to add a string to the User Agent field. In some instances, cURL allows for transferring data using various protocols such as HTTP. The local proxy can then examine the User Agent field, which indicates which agent module is making a request and where the request should be forwarded. For example, a software update module (patch module) may use the parameter module to create a string that includes the name of the process that loaded it as well as an identifier, such as a LANDesk identifier.

In another configuration, upon determining the requesting agent module, the local proxy may intercept certain types of requests and handle them directly. For example, the local proxy may receive an admin service request where an agent module is trying to send a large quantity of data to the admin system(s). In this case, the local proxy may identify the request and send the data included in the request to a database with instructions to later send the data to the designated admin system. This may be beneficial to alleviate network congestion. For instance, if a large amount of non-urgent data is to be uploaded from the client to the admin systems, the local proxy may handle the request and send the data to a nearby storage rather than to the admin systems. The local proxy can also send instructions with the data to send the data to the admin system(s) during times of low network traffic, such as during non-business hours. The local proxy may also send a confirmation reply to the requesting agent module when the data has been successfully loaded to the nearby storage and/or the admin system(s).

Various configurations of the systems and methods are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods as claimed, but is merely representative of the various configurations of the systems and methods.

FIG. 1 is a block diagram illustrating one configuration of a system 100 for forwarding content on a client 116 based on a request. FIG. 1 illustrates one or more administrative systems 102 and a client 116. Examples of the administrative (admin) system 102 and/or client 116 include desktop computers, laptop computers, servers, supercomputers, smartphones, tablet devices, game consoles, e-readers and/or other devices that include memory and a processor. In some configurations, the client 116 may be a managed node and the admin system 102 may be an admin core server.

The admin system(s) 102 may include a management application 104 and a communication interface 108. As used herein, a "module" or "application" may be implemented in hardware, software or a combination of both. For example, the management application 104 may be implemented in hardware, software or a combination of hardware and software. In one instance, the admin system(s) 102 may be used in connection with LANDesk Management Suite.

The management application 104 may include an admin services module 106. The admin services module 106 may provide services to clients 116 such as admin services. The admin services module 106 may also process requests made by clients 116. In some cases, the admin services module 106 may include one or more administrative services.

The connection interface 108 may connect the admin system(s) 102 to a network 110. For example, the network 110 may be a local area network (LAN), wireless LAN (WLAN), municipal area network (MAN), wide area network (WAN), the Internet, etc. In some configurations, the admin system(s) 102 and the client 116 may be a connected via a secure connection.

One or more clients 116 may be connected to the admin systems via a network 110. Each client 116 may include an agent 118, a local proxy 122 and a communication interface 124. The agent 118 may include one or more agent modules 120. For example, the agent 118 may be a software stack that is installed on the client 116 so that the client 116 may be managed by the admin system 102. In some configurations, the agent 118 may include many different applications that are loaded on the client 116. Each agent module 118 may enable an area of functionality that is implemented by one or more applications.

The agent module 120 may make requests to the admin system(s) 102. For example, the agent module 120 may request to download software from the admin services module 106 located on the admin system(s) 102. In some cases, the service performed by the agent module 120 may correspond to the service rendered by the admin services module 106.

In some configurations, when the agent module 120 sends a request to the admin services module 106, the agent module 120 uses the local proxy 122 to process the request. In some configurations, the local proxy 122 may be an executable that is launched for every connection that an agent module 120 needs to make to the administrative system 102. For example, the agent module 120 may send a request to local proxy 122 and the local proxy 122 will route the request to an admin system 102. The local proxy 122 may connect directly (e.g., directly route the request) to the admin system 102. Additionally or alternatively, the local proxy 122 may connect to (e.g., route the request to) the admin system 102 through a gateway (if the client is outside of a firewall, for example). In this manner, a client 116 (e.g., mobile computing device), may send requests to the admin system 102 regardless if they are part of the network 110 or otherwise connected to the Internet (e.g., outside the network 110). The proxy host 122 may forward the request from the agent module 120 to a different gateway and/or admin system 102 based on the request.

In some configurations, the agent module 120 may not need particular information on how to connect to the admin system 102. For example, if an agent module 120 needs to send a request to the admin system 102, the agent module 120 may connect to a local address and port and send the request to the local proxy 122. Then, the local proxy 122 either directly, or through a gateway, may send the request to the admin system 102. In this manner, the agent module 120 does not need to be concerned with where the admin system 102 is located, or if the client 116 is inside or outside of the network 110. For instance, the agent module may send all requests to localhost:localproxy and the local proxy 122 will process the request. Accordingly, the local proxy 122 may be on a client 116 such that if one or more agent modules 120 send requests to the local proxy 122, the local proxy 122 may know how to send the requests to the admin system 102 whether the client 116 is on an internal network or out on the Internet. The local proxy 122 may know where to send the request even with the addition of added gateway and admin systems 102.

The local proxy 122 may forward the request to the admin services module 106. For example, the local proxy 122 may be a proxy, proxy host, router proxy, multiplexor, etc. In some cases, the local proxy 122 may be a service on the client 116. After forwarding the request, the local proxy 122 may reply to the agent module 120, notifying the agent module 120 that the request was sent. The local proxy 122 may use the communication interface 124 to communicate with the admin services module 106 on the admin system(s) 102 over the network 110.

Figure 2:
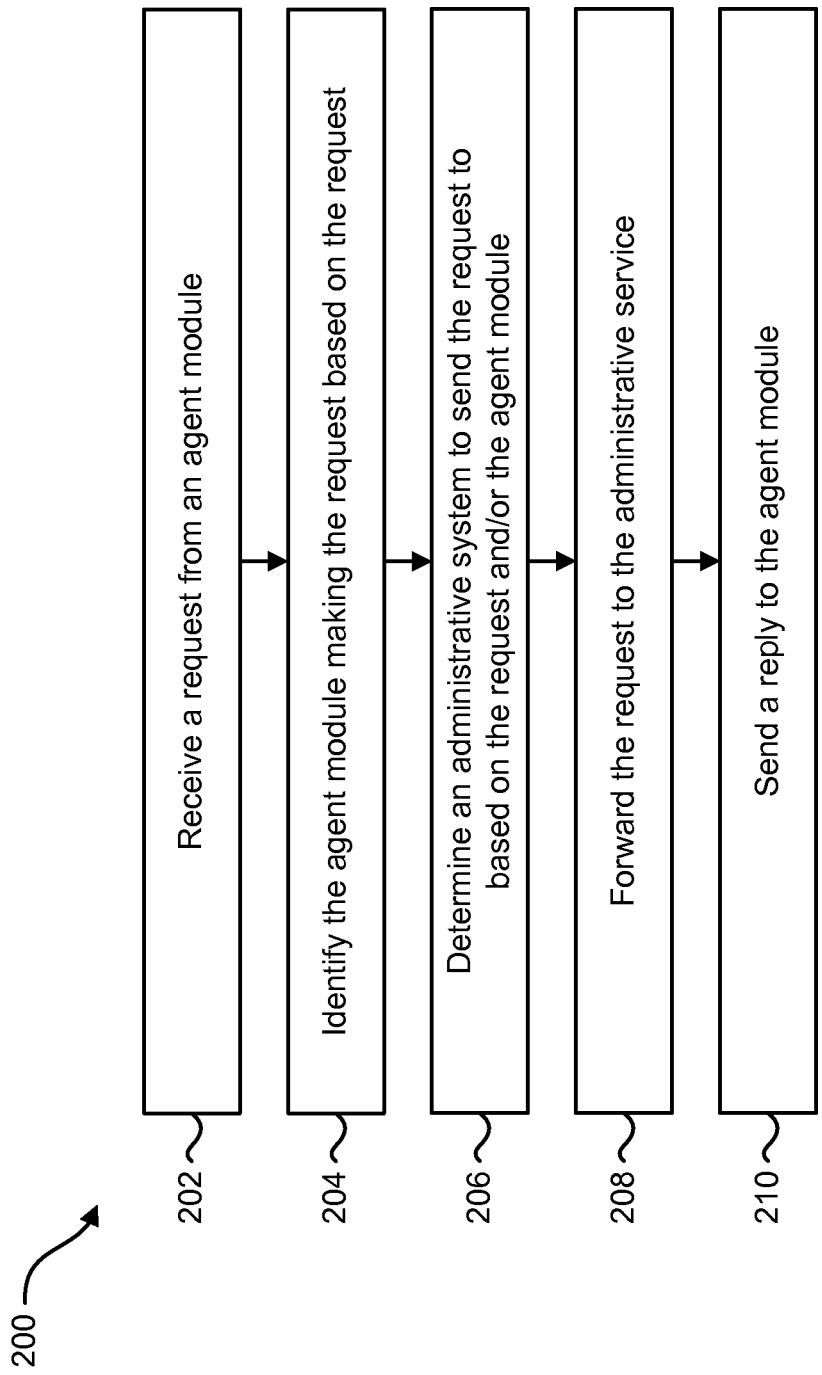
FIG. 2 is a flow diagram illustrating one configuration of a method for forwarding content on a client based on a request.

FIG. 2 is a flow diagram illustrating one configuration of a method 200 for forwarding content on a client 116 based on a request. The local proxy 122 may receive 202 a request from an agent module 120. For example, the agent module 120 may make a request to upload the client's 116 inventory to the admin services module 106 on an admin system 102. As another example, the local proxy 122 may receive 202 a request from the agent module 120 requesting that the results of a virus scan or software version check be sent to the admin services module 106. In some configurations and/or instances, the local proxy 122 may receive 202 multiple requests from multiple agent modules 120.

A service (e.g., the local proxy 122) may identify 204 the agent module 120 making the request based on the request (to obtain an identified agent module 120, for instance). For example, if the request was to send the client's inventory to the admin services module 106, then the local proxy 122 may identify 204 the agent module 120 making the request as an inventory module. As another example, if the request is to receive software updates, then the local proxy 122 may determine that the agent module 120 making the request is the patch (e.g., software update) module. In some configurations and/or instances, the local proxy 122 may identify 204 multiple agent modules 120 making multiple requests. Identifying 204 the agent module 120 will be described in greater detail below.

A service (e.g., the local proxy 122) may determine 206 the admin system 102 to send the request based on the request and/or the identified 204 agent module 120. In the case of multiple admin services modules 106 on a single admin system 102, the local proxy 122 may also need to determine the admin service 106 to send the request to. For example, if the request is to send an inventory listing, the local proxy 122 may determine 206 to send the request to the admin system 102 or the admin services module 106 responsible for inventory. As another example, the local proxy 122 may determine 206 that a request came from the agent module 120 dealing with detecting vulnerabilities. In this example, the local proxy 122 may determine 206 to send the request to the admin system 102 or the admin services module 106 responsible for network security.

The local proxy 122 may forward 208 the request to the administrative service determined as described above (e.g., the admin services module 106). For example, if the local proxy 122 determines 206 that the request is to be sent to the admin service responsible for inventory, then it may forward the request to the inventory admin services module 106.

The local proxy 122 may receive an acknowledgement, a confirmation and/or another type of reply for the admin services module 106. In some configurations, the local proxy 122 may act in behalf of the admin system 102. This is described below in connection with FIG. 8.

The local proxy 122 may then send 210 a reply to the agent module 120 (e.g., identified agent module 120) that sent the request. Additionally or alternatively, the local proxy 122 may send 210 a reply to the (requesting) agent module 120 upon sending the request to the admin service and/or admin services module 106.

Figure 3:
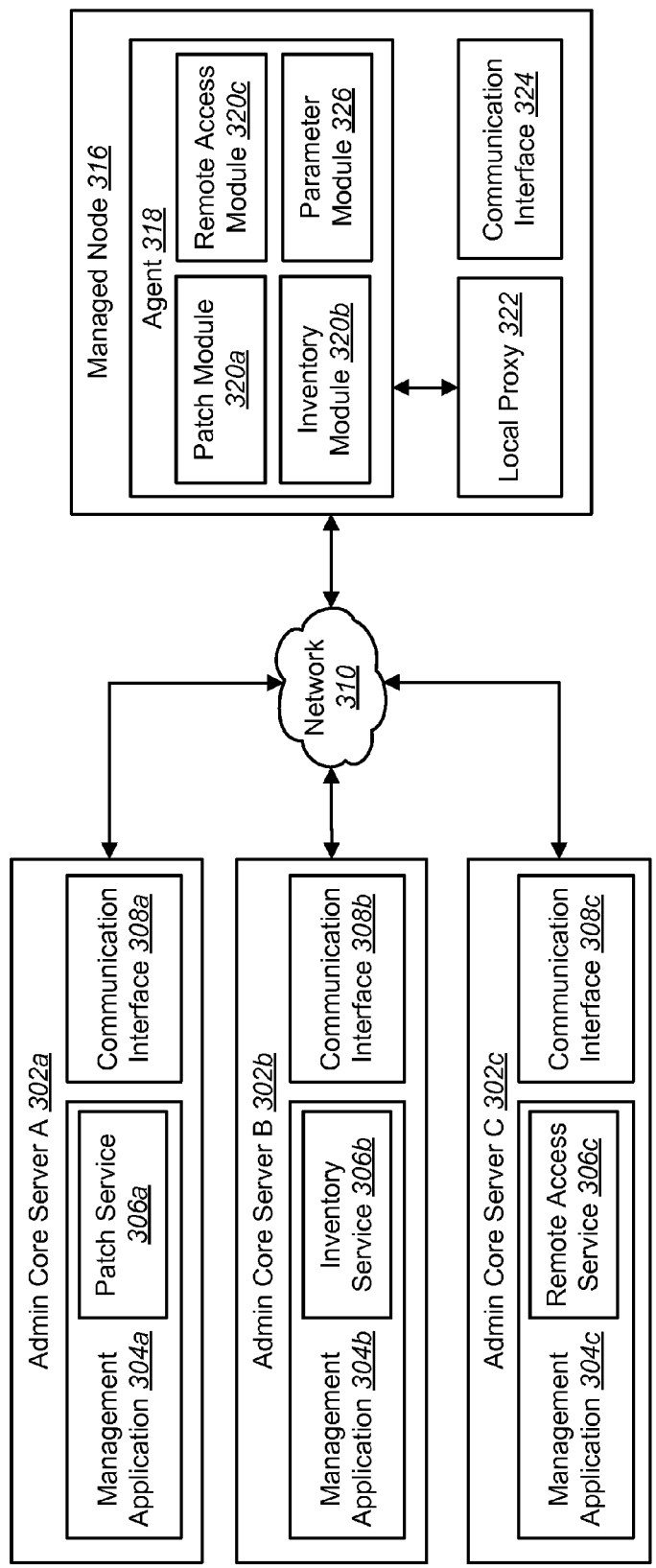
FIG. 3 is a block diagram illustrating a more specific configuration of a system for forwarding content based on a request.

FIG. 3 is a block diagram illustrating a more specific configuration of a system for forwarding content based on a request. The managed node 316 in FIG. 3 may be an example of the client 116 described above in connection with FIG. 1. The managed node 316 may include an application 318, a local proxy 322 and a communication interface 324 similar to corresponding components 118, 122, 124 described above in connection with FIG. 1. The managed node 316 may be connected to (e.g., be linked to, communicate with) the admin core servers 302a-c. The admin core servers 302a-c may be an example of the administrative systems 102 described above in connection with FIG. 1 and may respectively include management applications 304a-c, admin services modules 306a-c and communication interfaces 308a-c similar to corresponding components 104, 106, 108 described above in connection with FIG. 1.

The agent 318 may also include agent modules 320a-c similar to the agent modules 120 described in connection with FIG. 1. Examples of agent modules 320a-c on the managed node 316 may include a patch module 320a, an inventory module 320b and/or a remote access module 320c. It should be noted that additional and/or alternative agent modules 320a-c may be included on the managed node 316. For example, modules corresponding to virus scan/antivirus, downloading software, application virtualization, client security, process management, inventory, software management, etc., may also be included. In some cases, the agent modules 320a-c may perform multiple functions. For example, the patch module 320a may perform software updates as well as perform vulnerability scans. In other cases, each agent module 320a-c may be responsible for only a single function.

The agent 318 may also include a parameter module 326. The parameter module 326 may assist the other agent modules in creating requests to be sent to an admin service via the local proxy 322 on the managed node 316. For example, the parameter module 326 may create a string including the admin service name "wsvulnerabilitycore." This string may add to a URL or to a header. In either case, the local proxy 322 may use this parameter to indicate the requesting agent module 320 and the target admin core server 302. As another example, the parameter module 326 may use cURL to add one or more strings of information to a request. Additionally or alternatively, a variety of HTTP tools may allow the headers to be set to custom values.

In some configurations, the agent modules 320a-c may correspond to admin core servers 302a-c and admin services modules 306a-c. For example, the patch module 320a may correspond to admin core server A 302a, the inventory module 320b may correspond to admin core server B 302b and the remote access module 320c may correspond to admin core server C 302c. However, in some cases, an agent module 320 may have multiple functions that correspond to multiple admin core servers 302. Additionally or alternatively, multiple agent modules 320 may correspond to a single admin core server 302.

In one configuration, the patch module 320a may be used by the agent 318 and/or the managed node 316. For example, the patch module 306a may scan the managed node 316 for vulnerabilities (e.g., viruses, spyware, adware, malware, Trojans, worms, bugs, etc.). Additionally or alternatively, the patch module 320a may request updates. For example, an update may include new versions, patches, updates, upgrades, bug fixes and/or definitions, etc., for the application 318. An update may additionally or alternatively include a rollback or removal of one or more versions of the application 318, patches, updates, upgrades, bug fixes and/or definitions, etc. In one configuration, for instance, an update may include new vulnerability (e.g., virus, malware, adware, spyware, Trojans, worms, etc.) definitions and/or code used to address (e.g., remove, fix) the vulnerabilities. The patch module 320a may provide similar functions to the managed node 316 as it does for the application 318.

In performing one or more of these various functions, the patch module 320a may request services from the patch service 306a on admin core server A 302a. For example, the patch module 320a may request that software be sent from admin core server A 302a. As another example, the patch module 320a may request to send a virus scan report to admin core server A 302a. Additionally or alternatively, the patch module 320a may request that updates be sent from admin core server A 302a.

The request may be handled by the local proxy 322. In this way, the agent module, such as the patch module 320a, is not required to know where to send the request because the patch module 320a always sends requests to the local proxy 322. In other words, whether making requests for updates, software and/or virus scan reports, the patch module 320a always sends the request to the local proxy 322. Based on the request, the local proxy 322 identifies the agent making the request and the destination admin core server 302 where the request needs to be sent.

In some cases, the local proxy 322 may receive one request from the patch module 320a that needs to be sent to one admin core server 302a and another request for the patch module 320a that needs to be sent to a different admin core server 302b. In this case, the local proxy 322 identifies the patch module 320a that sent the request, determines the appropriate admin core server 302 to send the request to and forwards the request. Additionally or alternatively, the local proxy 322 may determine which admin core server 302 to send the request based on proximity or using a range of IP addresses.

In one configuration, the inventory module 320b may be used by the agent 318 and/or the managed node 316. For example, the inventory module 320b may take inventory or all hardware and/or software components on the managed node 316. The inventory module 320b may then request to send a list of recorded inventory to the Inventory Service 306b on admin core server B 302b.

In yet another configuration, the agent 318 and/or the managed node 316 may use the remote access module 320c to send requests to the remote access service 306c on admin core server C 302c. The remote request module 320c may send a request to update remote access preferences along with a variety of other requests, such as wake-on LAN, user authorizations, etc.

The local proxy 322 may forward requests to one or more admin core servers 302a-c. Each admin core server 302a-c may include a management application 304, one or more admin services 306a-c and a communication interface 308. The management application 304 may monitor, maintain and regulate the one or more admin services 306a-c. In some configurations, the management application 304 may be used in conjunction with LANDesk Management Suite.

The admin services module 306 on each server 302 may correspond to a function provided by the agent module 320 on the managed node 316. For example, the patch module 320a may request that software be downloaded on a managed node 316 so an update may be performed. In this case, the local proxy 322 may send the request to the patch service 306a on admin core server A 302a. Upon receiving the request, the patch service 306a may fulfill the request by sending the requested software to the requesting managed node 316.

As another example, the inventory module 320b may send a request to the Inventory Services 306b located on admin core server B 302b via the local proxy 322. The Inventory Services 306b may record and keep track of the inventory of all devices present on the network 310. In this way, an administrator assisting the user on a managed node 316 may acquire the current hardware and/or software on the managed node 316 from the Inventory Services 306b.

In yet another example, the remote access module 320c may send a request to the local proxy 322. The local proxy 322 may determine that the request should be forwarded to the remote access service 306c on admin core server C 302c. The request may include updated remote access preferences and/or other data.

In some cases, data may accompany the request. For example, the inventory module 320b may submit a request along with data reports and system logs. In another example, the patch module 320a may submit a quarantined copy of a questionable virus along with a request. The local proxy 322 may forward this data along with the request to the appropriate admin core server 302.

In some configurations, the agent modules 320a-c may employ a parameter module 326 to create and/or send a request. For example, the patch module 320a may use the parameter module 326 to add a parameter to the request indicating an admin service name. Additionally or alternatively, the local proxy 322 may use the parameter module 326 or a similar component (not shown) to retrieve a parameter from a request.

Figure 4:
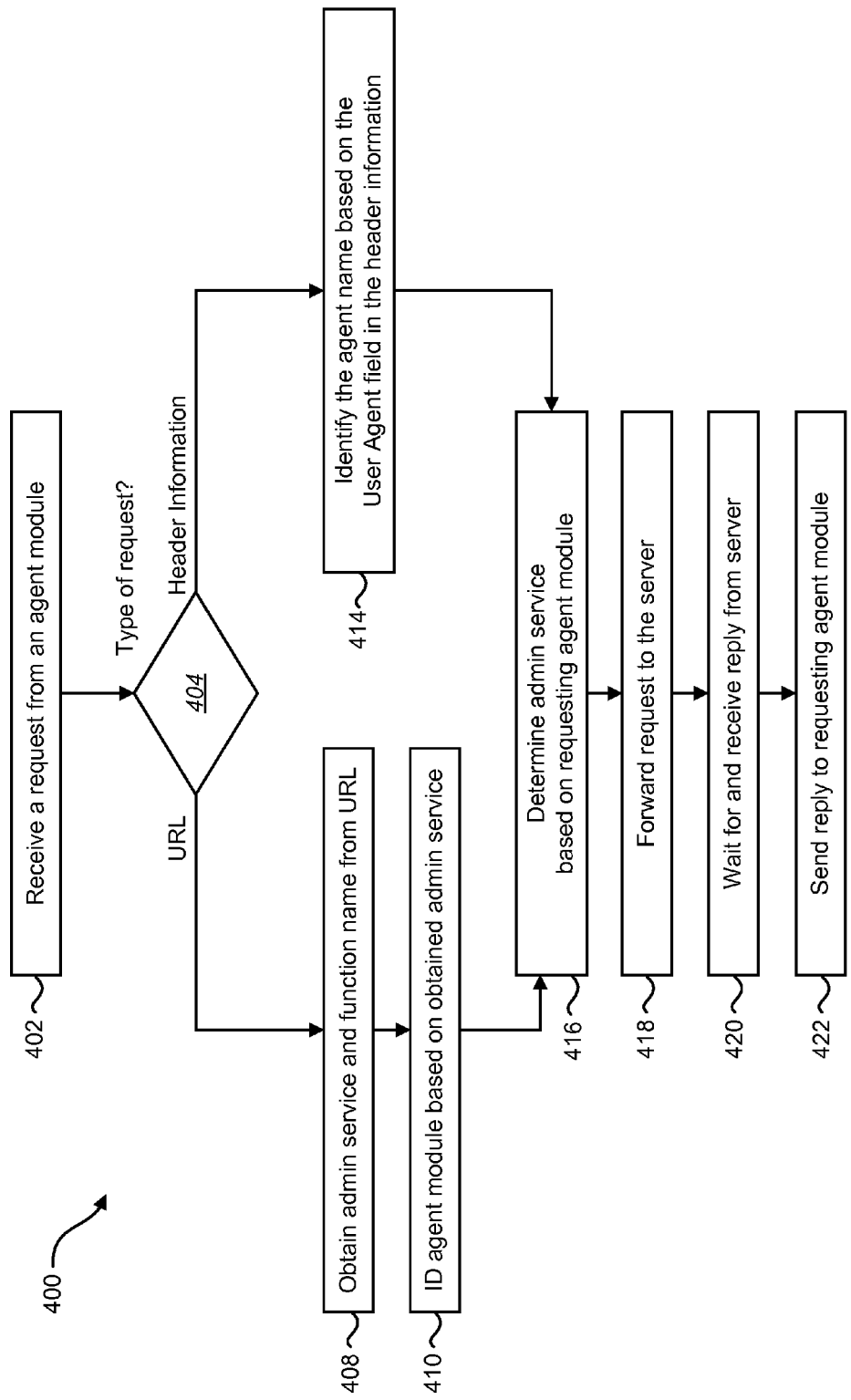
FIG. 4 is a flow diagram illustrating a method for forwarding content on a client based on a request.

FIG. 4 is a flow diagram illustrating a method 400 for forwarding content on a managed node 316 based on a request. The local proxy 322 receives 402 a request from an agent module 320. In some cases, the request may be a request for admin services (e.g., an admin services request), a web services request, a file download request, a post data request, etc. The local proxy 322 then determines 404 the type of request being made. For example, multiple methods of determining the type request may be employed.

In one example, the local proxy 322 may use a Universal Resource Locator (URL) to determine 404 the agent module 320 making the request. For example, the URL in the request may include information such as post data. For instance, the post data may include an admin service name, a function name and/or other identifying information.

For instance, the URL itself may indicate the requesting agent module 320 and the destination admin core server 302. For instance, a request could be made to send vulscan (vulnerability scan) data to wsvulnerabilitycore. The local proxy 322 may obtain 408 the admin service name and/or function name from the URL. In this instance, the local proxy 322 may obtain 408 the admin service name "wsvulnerabilitycore." Additionally or alternatively, the local proxy 322 may obtain 408 the function name "vulscan" from the request. The local proxy 322 may then use this information to identify (ID) 410 the agent module 320 that uses the requested admin services.

The local proxy 322 may identify 410 the agent module 320 based on the obtained 408 administrative service 306. Continuing the above example, the local proxy 322 may identify 410 the patch module 320a as the agent module 320 based on the obtained 408 information.

Whether the type of request is a URL or header information, the local proxy 322 may determine 416 the appropriate admin services 306 based on the requesting agent module 320. In other words, based on an identification 410, the local proxy 322 may determine 416 the appropriate admin services 306 to send the request and/or data to. Continuing the example above, the local proxy 322 may determine 416 that the patch service 306a on admin core server A 302a is the appropriate destination.

The local proxy 322 may then forward 418 the request to the server 302. Here, the local proxy 322 may then forward 418 the request to admin core server A 302a and send 422 a reply to the requesting agent module 320a. Additionally, the local proxy 322 may optionally wait 420 for and receive a reply from the admin core server 302 before sending 422 a reply to the requesting agent module 320.

In another example, the local proxy 322 may use header information (e.g., HTTP header information) to determine 404 the type of request and the agent module 320 making the request. In other words, the header information may include information indicating the admin service name and/or function name. For example, existing header parameter fields may be modified and/or new parameters may be created to supply the local proxy 322 with the necessary information. This information may be added to a header with the assistance from the parameter module 326. For example, the parameter module 326 may use cURL to add a string of information to the HTTP header. Additionally or alternatively, the string may include the name of the process that loaded it as well as an identifier, such as a LANDesk identifier. In some instances, the local proxy 322 may employ the parameter module 326 (or a similarly functioning module not shown) to retrieve certain fields from an HTTP header file including header information.

In some cases, the User Agent field in an HTTP header may be used. This field is usually used to tell the server the type of browser making the request. The parameter module 326 may add a string to the User Agent field. For example, the string "LANDesk File Downloader-sdclient.exe" may be added to the User Agent field in the HTTP header information. The local proxy 322 may then inspect the header information User Agent field to determine 404 the type of request being made.

Additionally or alternatively, the parameter module 326 may add a string to the User Agent field in the HTTP header based on the requesting module 320. For example, the patch module 320a may request the parameter module 326 add a string to the User Agent field. In this case, the parameter module 326 may link to the patch module 320a and add the string "sdclient.exe" to the User Agent field. This may be because the parameter module 326 knows that any request from the patch module 320a relates to "sdclient.exe." In some cases, the parameter module 326 may use cURL and/or other HTTP tools to modify the User Agent field.

The local proxy 322 may identify 414 the agent module 320 based on the User Agent field in the header information. Continuing the above example, the local proxy 322 may see the string "LANDesk File Downloader-sdclient.exe" in the User Agent field and identify 414 the agent module 320 name based on the User Agent field in the header information. In other words, local proxy 322 may inspect the User Agent field in the request and identify 414 that sdclient.exe was requesting the download. Further, the local proxy 322 may know that sdclient.exe is a software distribution client executable belonging to the patch module 320a.

Based on the identified agent module 320, the local proxy 322 may determine 416 the appropriate admin services 306 to forward 418 the request and/or data to. In the above example, the local proxy 322 may determine 416 to forward the request and/or data to the patch service 306a on admin core server A 302a.

Once the local proxy 322 forwards 418 the request and/or accompanying data to the admin services 306, it may send 422 a reply to the requesting agent module 320. Here, the local proxy 322 may send a reply to the patch module 320a indicating that the request has been sent and/or received by the patch services 306a on admin core server A 302a.

Figure 5:
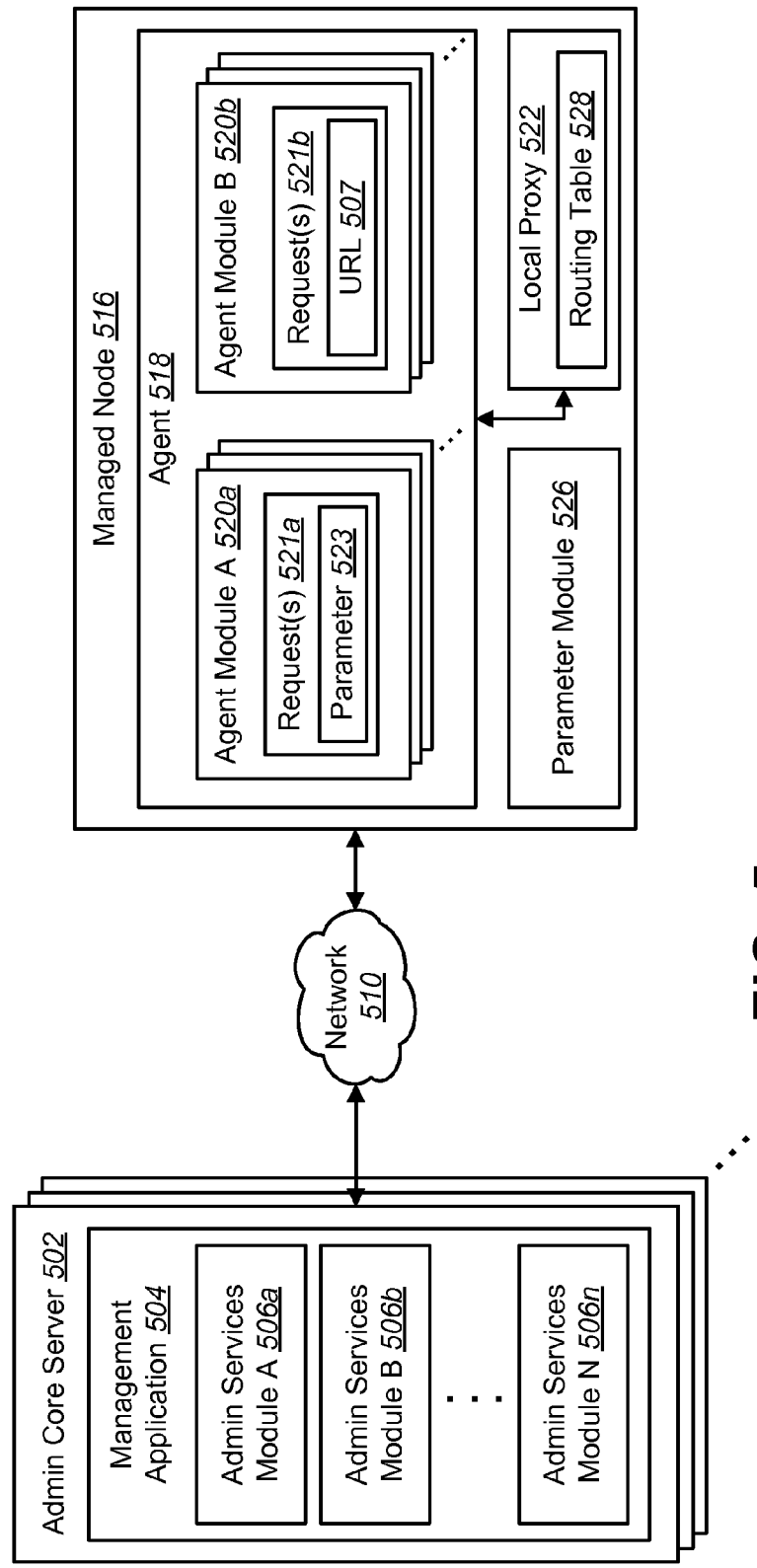
FIG. 5 is a block diagram illustrating another configuration for forwarding content based on a request.

FIG. 5 is a block diagram illustrating another configuration for forwarding content based on a request. FIG. 5 illustrates an administrative (admin) core server 502 and a managed node 516. The admin core server 502 may be configured similarly to the admin system(s) 102 described in connection with FIG. 1 and the admin core server 302 described in connection with FIG. 3. Specifically, the admin core server 502 may include a management application 504 and admin services modules 506a-n, which may be similar to corresponding components 102, 104, 106, 302, 304 and 306a-c described above in connection with FIG. 1 and FIG. 3. The admin core server 502 may communicate with the managed node 516 via a network 510.

The managed node 516 may be configured similarly to the client 116 and/or the managed node 316 described previously. Specifically, the managed node 516 may include an application 518, agent modules 520a-b, a local proxy 522 and a parameter module 526, which may be similar to corresponding components 118, 120, 118, 122, 318, 320a-c, 322 and 326 described above in connection with FIG. 1 and FIG. 3. Note that while the parameter module 526 is located outside of the agent 518 in FIG. 5, it may be alternatively included within the agent 518 similarly to the parameter module 326 described above in connection with FIG. 3.

The agent 518 may include one or more agent modules 520. For example, agent module A 520a may be part of the agent 518 and may include one or more requests 521a-b. Each request 521a may include one or more parameters 523. In some instances, the parameter 523 may be a string of data located in an HTTP header, data appended to the request and/or information sent in the request 521a to the local proxy 522. The parameter 523 may be incorporated into the request with the assistance of the parameter module 526. Additionally or alternatively, the local proxy 522 may use the parameter module 526 or a similar component (not shown) to retrieve the parameter 523 from the request 521a. The local proxy 522 may use the parameter 523 to identify the agent module 520 making the request 521a and the appropriate admin services module 506 to send the request to. For example, if the local proxy 522 received a request 521a and obtained the parameter 523 "inventory_report" from the User Agent field in an HTTP header, then the local proxy 522 could identify that the inventory module sent the request and that the request should be forwarded to the admin core server 502 housing the admin services module 506 responsible for managing inventory.

Additionally or alternatively, the agent 518 may include an agent B 520b. The agent B 520b may include one or more requests 521b. Each request 521b may include a URL 507. The local proxy 522 may use the URL 507 in the request 521b to identify the agent module 520 making the request 521b and the appropriate admin services module 506 to send the request to. For example, the URL 507 may identify that agent module B 520b sent the request and that the request should be forwarded to admin services module B 506b.

In one configuration, an agent module 520 may make multiple requests 521. In some cases, each request may need to be forwarded to a different admin services module 506a-n. For example, the agent B 520b may send a first request 521b to admin services module B 506b and send a second request 521b to admin services module N 506n. Additionally or alternatively, the agent module 520 may make multiple requests 521, where each request may need to be forwarded to the same admin services module 506. In other words, the local proxy 522 may receive a plurality of requests 521 from a plurality of agent modules 520.

Furthermore, agent A 520a and agent B 520b may both send requests 521 to the local proxy 522 at substantially the same time. The local proxy 522 may then process each request 521 and forward each request to the admin core server 502 containing the appropriate admin services module 506. In the case of multiple requests 521 arriving at the local proxy 522 at the same time, priority may be given to one request type over another. For example, priority may be given to the request 521 requiring the least amount of processing or to the request 521 with the smallest size. Alternatively, priority may be determined by some other approach.

In some configurations, after the requesting agent module 520 is determined, the local proxy 522 may use a routing table 528 to determine where the request 521 should sent. Information such as a parameter 523, header information, a URL 507 and/or other information may assist the routing table 528 in forwarding the requests 521 to the correct destinations.

FIG. 6 is a diagram illustrating one example of a routing table. For instance, the routing table 670 illustrated in FIG. 6 may be one example of the routing table 528 described in connection with FIG. 5. The routing table 628 may include a function name 630, an admin service name 632, an agent module 620, a destination 634 and other information such as load capacity 636.

The local proxy 522 may obtain the function name 630 and/or admin service name 632 from a request 521. For example, the local proxy 522 may obtain the function name 630 "Patch B" from a request. Based on the obtained function name 630, the local proxy 522 may determine the agent module 620 that sent the request 521. For example, if the local proxy 522 receives a request 521 with the function name 630 "Patch A," the local proxy 522 may identify the patch module as the agent module 620 sending the request 521. As another example, if the local proxy 522 receives a request 521 with the function name 630 "Inventory," the local proxy 522 may identify the inventory module as the agent module 620 sending the request 521.

As another example, the local proxy 522 may identify the agent based on the obtained admin service name 632. For instance, the local proxy 522 may obtain the admin service name 632 "wsremoteaccesscore" from a request 521. In this instance, the local proxy 522 may identify the remote access module as the requesting agent module 620.

The local proxy 522 may determine the destination 634 based on the obtained information such as the function name 630 and/or the admin service name 632. For example, the local proxy 522 may use the obtained function name 630 "Patch A" to determine the destination 634 of "204.246.148.156:1000." The local proxy 522 may then send that request 521 its destination 634. The local proxy 522 may send another request 521 to destination 634 "204.246.148.156:1001" because the function name 630 obtained was "Patch B." In another example, the local proxy 522 may send a request 521 to a destination 634 "204.246.148.148:8445" because the admin service name 632 obtained was "Virus Scan."

In yet another example, the local proxy 522 may use both the obtained function name 630 and admin service name 632 to determine where to forward the request 521. For instance, the local proxy 522 may use both the obtained function name 630 "downloader" and admin service name 632 "wsdlcore" to determine the destination 634 of "204.246.148.156:1004."

Note that requests 521 with different function names 630 and/or admin service names 632 may be forwarded to the same destination 634. For example, a request 521 with the function name 630 "Patch A" may be forwarded to the same destination 634 as a request 521 with the function name 630 "Inventory." Further, requests 521 with the same or similar function names 630 and/or admin service names 632 may be forwarded to different destinations 634. For example, a request 521 with the function name 630 "Patch A" may be forwarded to the destination 634 "204.246.148.156:1000" while a request 521 with the function name 630 "Patch B" may be forwarded to the destination 634 "204.246.148.156:1001."

Additionally or alternatively, the local proxy 522 may determine the destination 634 based on the identified agent module 620. For example, a request 521 with the agent module 620 responsible for inventory may be forwarded to the destination 634 "204.246.148.156:1004." As another example, a request 521 with the agent module 620 remote access module may be forwarded to the destination 634 "wsremoteaccesscore." Furthermore, the local proxy 522 may determine where to send the request based on proximity or using a range of IP addresses.

In some configurations, the local proxy 522 may route requests directly to an admin core server 502 (e.g., client on an internal network) or if that fails, the local proxy 522 may route to a single gateway appliance that is accessible on the Internet through which it can connect to the admin core server 502. This may be applied for a mobile computing device to connect to an internal network when it is outside of the internal network, for example. In other words, the local proxy 522 may attempt direct connection and if that fails, the local proxy 522 may attempt connection through the gateway. In other words, all the agent modules 520 that need to talk to the admin core server 502 may not need to know about the gateway. Rather, the agent modules 520 may send their requests to a localhost:proxyhost port. The systems and methods disclosed herein may allow expansion of these procedures to handle multiple admin core servers 502 and/or multiple gateways that the local proxy 522 will be able to communicate with.

In particular, multiple admin core servers 502 may handle different functions. Each managed node 516 may be able to periodically obtain information describing which admin core servers 502 are handling which functionality. Then, in accordance with the systems and methods disclosed herein, the local proxy 522 may determine from the request where to send the request. This determination may include selecting one or more gateway appliances (e.g., cloud services appliances) through which to connect to an admin core server 502 on the internal network. This may include fault tolerance and/or load balancing in order to spread the traffic. In this way, more managed nodes may be enabled to connect to the multiple admin core servers 502.

Destinations 634 may or may not include port numbers. For example, routing table 628 entries 1-4, 6 and 8 include port numbers while routing table 628 entry 7 does not. Additionally, a destination 634 may be an IP (Internet Protocol) address or another type of identifier, such as a server name. For example, routing table 628 entry 7 is the name of an admin core server 502, "wsremoteaccesscore."

Additionally or alternatively, the local proxy 522 may determine the destination 634 to forward the request 521 to based on additional factors such as load capacity 636. For example, a request 521 with function name 630 "Patch A" may be forwarded to one of many admin core servers 502. The network 510 may include admin core servers 502 with redundant admin services modules 506. In this case, the local proxy 522 may forward the request 521 to one destination 634 based on load capacity 636. For example, the local proxy 522 may notice that the destination 634 in routing table 628 entry 1 is at 95% capacity and choose to forward the request to the destination 634 in routing table 628 entry 2. Another factor the local proxy 522 may consider is if the destination 634 is available or busy and/or the amount of free space remaining at the destination 634, such as shown in routing table 628 entries 7 and 8.

In some configurations, the local proxy 522 may determine to send the request 521 and/or accompanying data to a storage device with instructions to later forward the request 521 and/or accompanying data to the destination 634 containing the admin services 506.

In some configurations, the routing table 628 may be updated dynamically. For example, the local proxy 522 may receive updates from the agent 518 regarding the availability, status, load capacity, etc., of various destinations 634. In other words, the local proxy 522, as a service on the managed node 516, may contain a routing table 528 that is dynamically updated. Additionally or alternatively, the agent 518 may receive bulk destination updates regarding multiple destinations 634 or may receive destination updates regarding a single destination 634. For example, if the admin core server 502 containing admin services module B 506b becomes unavailable, the managed node 516 may receive an update from admin core server A 502a, another client or some other device notifying it of the change. Additionally, the agent 518 may be notified when additional admin core servers 502 and/or additional admin services modules 506 are added to the network 510. Thus, as the routing table 628 dynamically updates, the local proxy 522 may be able to forward requests 521 more efficiently and balance network traffic. Additionally, in a similar manner the local proxy may compensate for fault tolerances. In this manner, additional devices may be connected to the network 510 without incident.

Figure 7:
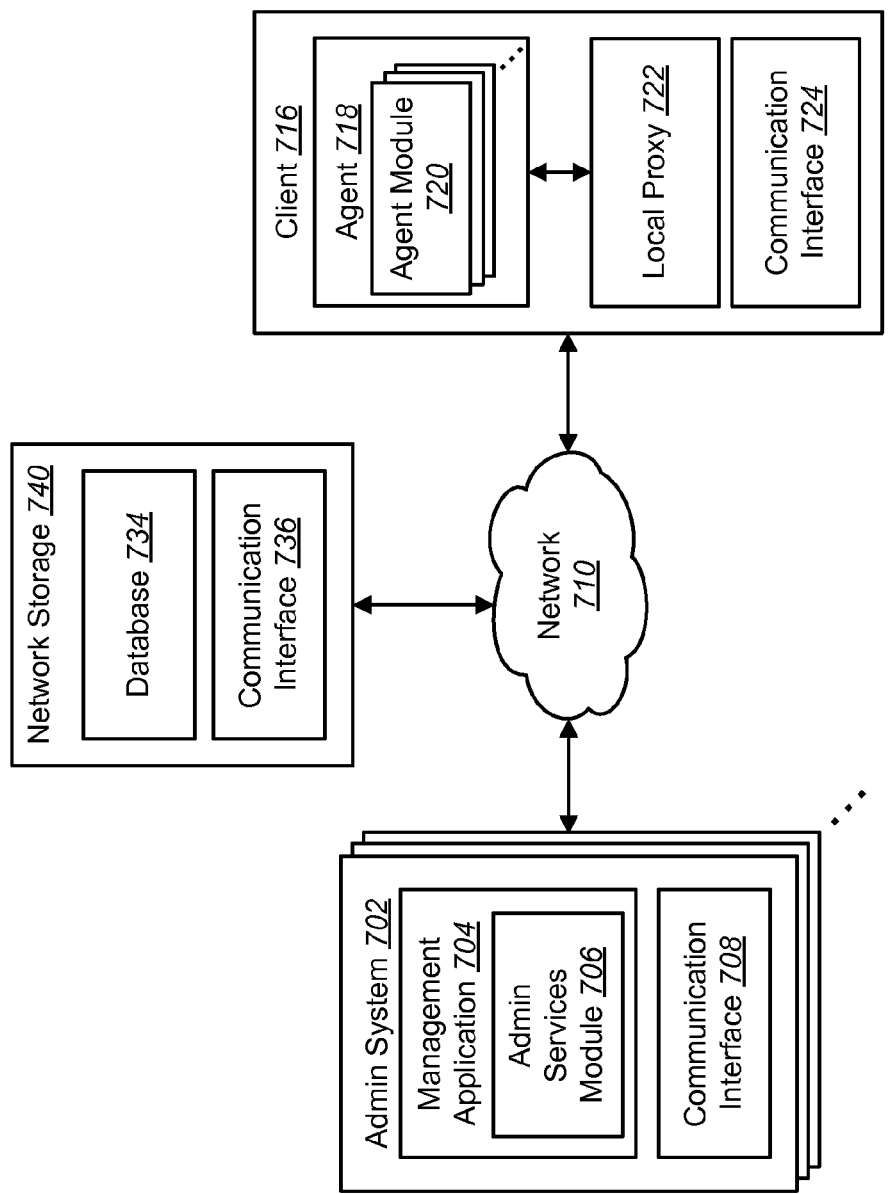
FIG. 7 is a block diagram illustrating another configuration of a system for forwarding content on a client based on a request.

FIG. 7 is a block diagram illustrating another configuration of a system for forwarding content on a client based on a request. FIG. 7 illustrates an admin system 702, a client 716 and network storage 740. The admin systems 702 and client 716 may include similar components as those described previously. For example, the management application 704, admin services module 706 and communication interface 708 may be similar to corresponding components described above. Additionally, the client 716 may include an application 718, agent module 720, local proxy 722 and communication interface 724 similar to corresponding components described above. Further, the admin systems 702 may communicate with the client 716 via a network 710.

Network storage 740 may also be connected to the admin systems 702 and client 716 via a network 710. The network storage 740 may include one or more databases 734 and a communication interface 736.

In some configurations, the local proxy 722 may forward a request and/or accompanying data to the network storage 740. The request and/or data may be forwarded with instructions from the local proxy 722 to hold the request and/or data until a later time. For example, the local proxy 722 may instruct the network storage 740 to send the request and/or data during times of lower network traffic, such as during non-business hours.

In this way, the local proxy 722 may process requests directly and determine that a direct send to the admin systems 702 is not necessary. In other words, the local proxy 722 may intercept a request and handle it directly.

The local proxy 722 may determine to intercept only certain types of requests. For example, the local proxy 722 may intercept all requests from the inventory agent module 720. For instance, the local proxy 722 may do this because requests from the inventory agent module 720 are low priority and include a large amount of data that could clog up the network during peak hours. Additionally or alternatively, the local proxy 722 may intercept all HTTP post requests. The local proxy 722 may use a variety of criteria to determine whether a request should be intercepted. For instance, these criteria may be based on function name, admin service name, request size, request priority, URL, parameter, network congestion level and/or time of day, etc.

The network storage 740 may be located locally or remotely. For example, routing table 628 entry 7 in FIG. 6 shows a local storage destination 634 address while entry 8 shows a remote destination 634 address. Further, the local proxy 722 may use the same or different criteria described above to determine which network storage 740 is appropriate.

Once the local proxy 722 sends the request and/or data to the network storage 740, it may notify the requesting agent module 720 that the request was successfully sent. Additionally or alternatively, it may notify the requesting agent module 720 when the admin core server 702 receives the request from the network storage 740.

Figure 8:
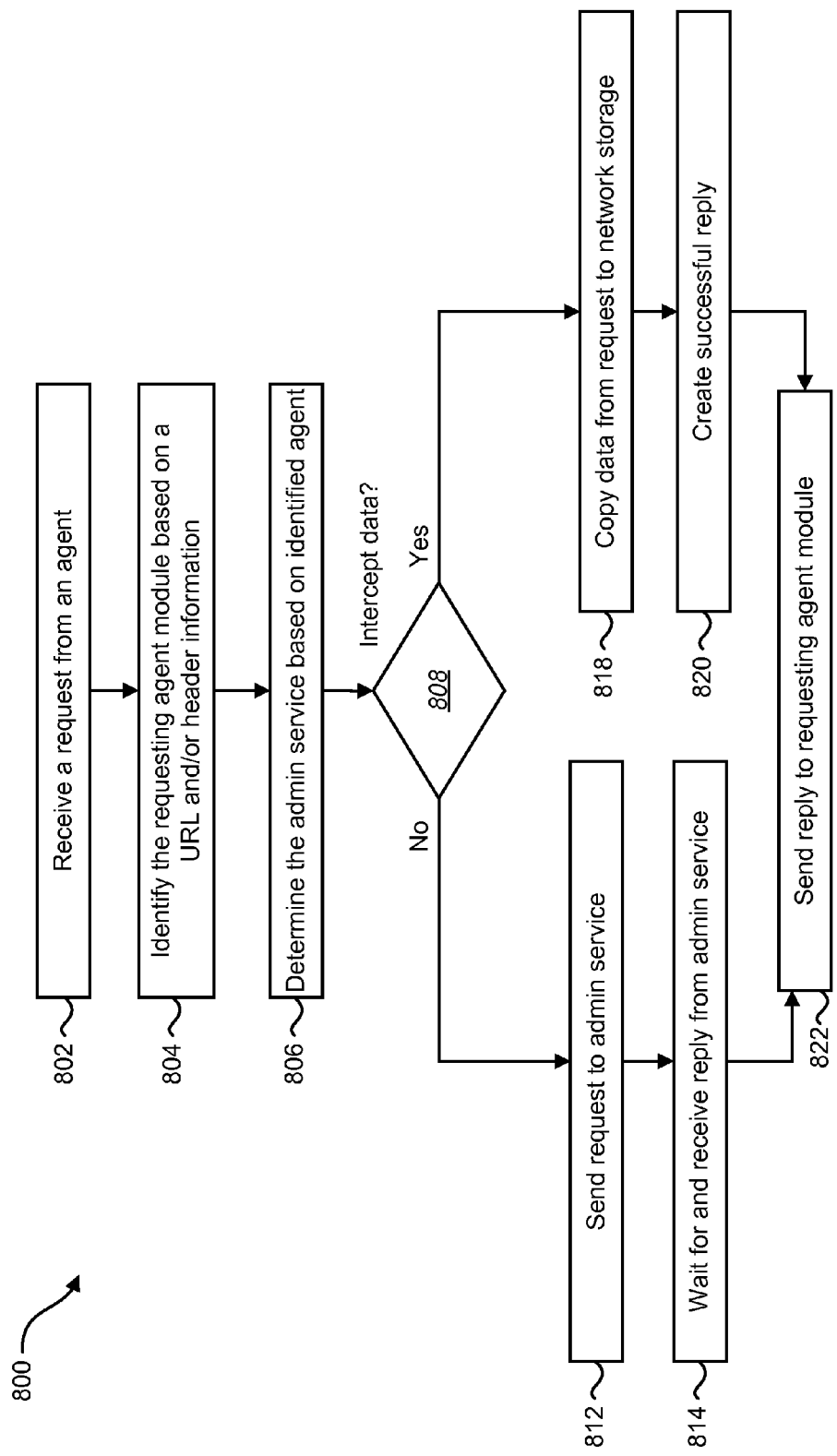
FIG. 8 is a flow diagram illustrating a more specific configuration of a method for forwarding content on a client based on a request.

FIG. 8 is a flow diagram illustrating a more specific configuration of a method 800 for forwarding content on a client 716 based on a request. The local proxy 722 may receive 802 a request from an agent module 720. The local proxy 722 may identify 804 the requesting agent module 720 based on a URL and/or header information.

The admin service 706 may be determined 806 based on the identified agent module 720 and/or request information. In some configurations, steps 802-806 may be similar to steps 402-416 described above in connection with FIG. 4.

In some configurations, the local proxy 722 may determine 808 whether to intercept the data. For example, if the request includes a large amount of post data, the local proxy 722 may intercept the request and process it directly. In other words, the local proxy 722 may delay the forwarding of the request until a later time.

If the local proxy 722 determines 808 to intercept the data, the data may be copied 818 to the network storage 740. The network storage 740 may be a local nearby storage device on a local network 710, or it may be located remotely. For example, the network storage 740 may be a Universal Naming Convention (UNC) share located near the client 716. The local proxy 722 may create 820 a successful reply and send 822 the reply to the requesting agent module 720. In this way, for example, the local proxy 722 may act in behalf of the admin system 702 (e.g., admin service 706).

If the local proxy 722 determines 808 not to intercept the request and/or data, the local proxy 722 may send 812 (e.g., forward) the request and/or data to the admin system(s) 702 containing the appropriate admin service 706. The local proxy 722 may optionally wait for 814 and receive a reply from the admin service 706. If the local proxy 722 receives a reply from the admin service 706, it may send 822 that reply to the requesting agent module 720. In some cases, the local proxy 722 may send 822 multiple replies to the requesting agent module 720.

Figure 9:
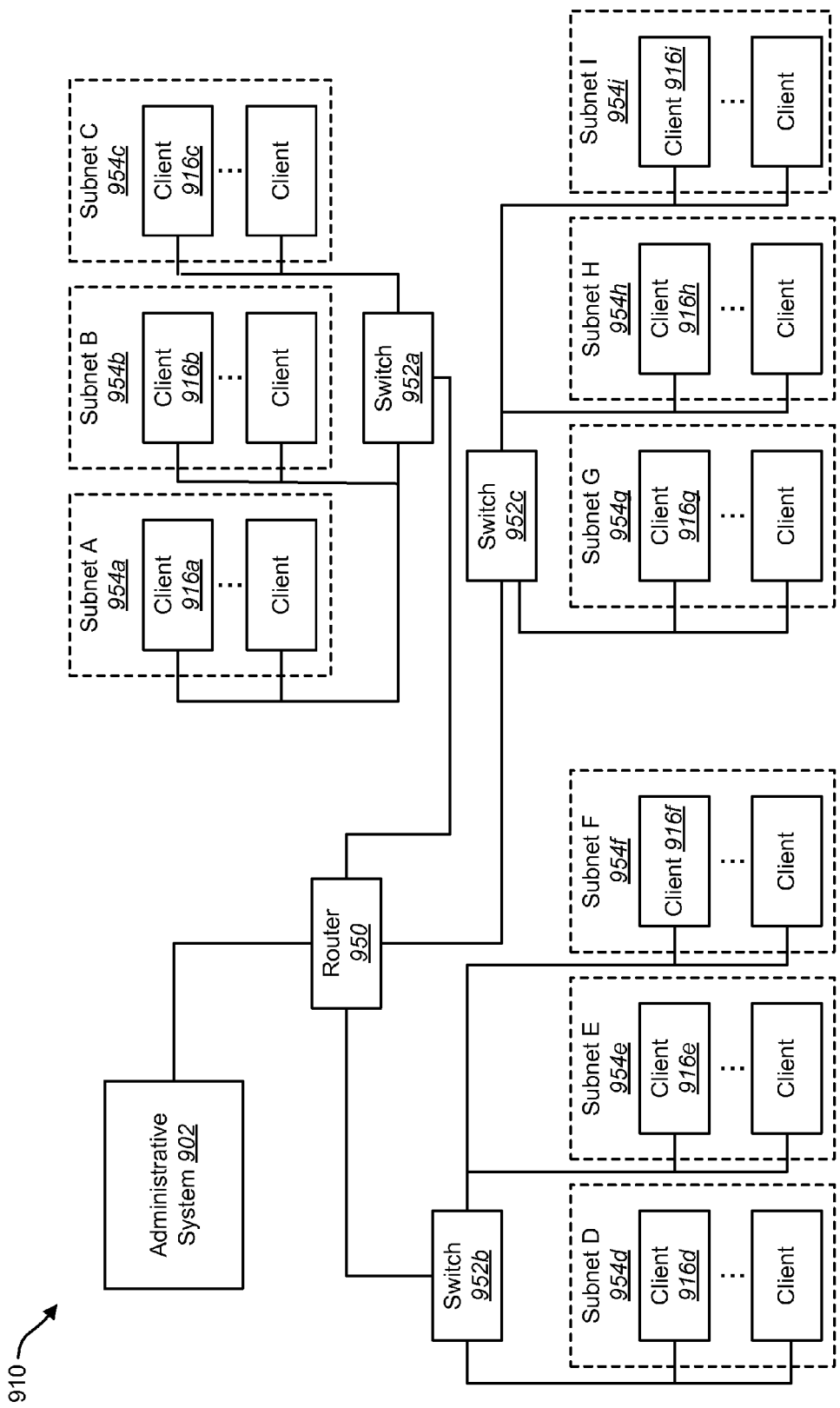
FIG. 9 is a block diagram illustrating a configuration of a network where systems and methods for forwarding content based on a request may be implemented.

FIG. 9 is a block diagram illustrating a configuration of a network 910 where systems and methods for forwarding content based on a request may be implemented. An administrative system 902 (e.g., computing device and/or administrative system) may be connected to a router 950. The router 950 may be connected to switches 952a, 952b, 952c. The switch 952a may be connected to several clients (e.g., managed nodes) 916a, 916b, 916c, etc., via their respective subnets 954a, 954b, 954c. The switch 952b may be connected to several clients 916d, 916e, 916f, etc., via their respective subnets 954d, 954e, 954f. The switch 952c is connected to several clients 916g, 916h, 916i, etc., via their respective subnets 954g, 954h, 954i. Although FIG. 9 only shows one router 950 and a limited number of switches 952, subnets 954 and clients 916, many and varied numbers of routers 950, switches 952, subnets 954 and clients 916 may be included in networks and/or systems where systems and methods for forwarding content on a client based on requests may be implemented. It should be noted that the administrative system 902 illustrated in FIG. 9 may be configured similarly to one or more of the admin systems 102, 702 and/or the admin core servers 302, 502 described above. It should also be noted that the clients 916 illustrated in FIG. 9 may be configured similarly to one or more of the clients 116, 716 and/or the managed nodes 316, 516 described above.

Figure 10:
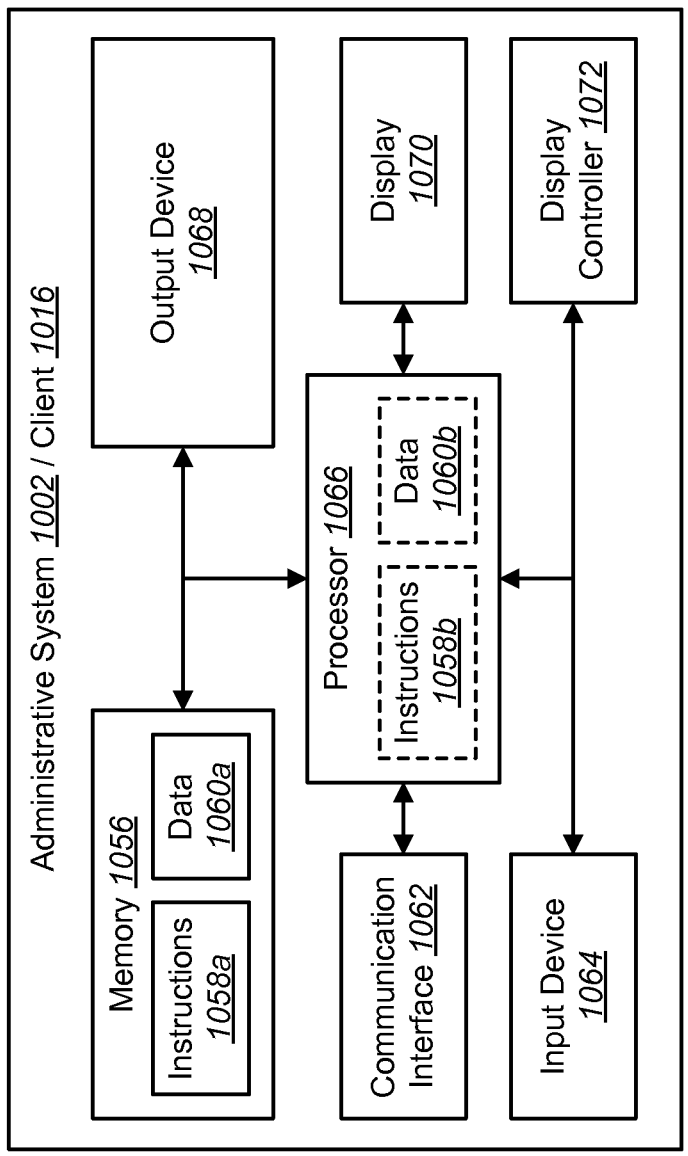
FIG. 10 illustrates various components that may be utilized in an administrative system and/or client.

FIG. 10 illustrates various components that may be utilized in an administrative system 1002 (e.g., admin core server) and/or client 1016 (e.g., managed mode). The illustrated components may be located within the same physical structure or in separate housings or structures. The administrative system 1002 or client 1016 may be configured similarly to one or more of the admin systems 102, 702, 902, admin core servers 302, 502, clients 116, 716, 916 and managed nodes 316, 516 described above.

The administrative system 1002 or client 1016 may include one or more processor(s) 1066 and memory 1056. The memory 1056 may include instructions 1058a and data 1060a. The processor 1066 controls the operation of the administrative system 1002 or client 1016 and may be, for example, a microprocessor, a microcontroller, a digital signal processor (DSP) or other device known in the art. The processor 1066 may be in electronic communication with the memory 1056. The processor 1066 typically performs logical and arithmetic operations based on program instructions 1058b and/or data 1060b it loads from the memory 1056.

The administrative system 1002 or client 1016 typically may include one or more communication interfaces 1062 for communicating with other electronic devices. The communication interfaces 1062 may be based on wired communication technology, wireless communication technology or both. Examples of different types of communication interfaces 1062 include a serial port, a parallel port, a Universal Serial Bus (USB) port, an Ethernet adapter, an IEEE 1394 bus interface, a small computer system interface (SCSI) bus interface, an infrared (IR) communication port, a Bluetooth wireless communication adapter, a network storage device, an external hard drive, an optical drive (e.g., Compact Disc (CD) drive, Digital Video Disc (DVD) drive, Blu-ray drive, etc.) and so forth.

The administrative system 1002 or client 1016 typically may include one or more input devices 1064. Examples of different kinds of input devices 1064 include a keyboard, mouse, microphone, remote control device, button, joystick, trackball, touchpad, lightpen, camera and/or other input device 1064. The input device 1064 may receive input from another device and/or from a user of the administrative system 1002 or client 1016. The input device 1064 may comprise multiple devices, blocks and/or modules that the administrative system 1002 or client 1016 may use to receive information. For instance, an input device 1064 may be an Ethernet card that can receive information from another computing device connected to a network 110, 510. In another example, the input device 1064 may be a computer mouse that may be used by the administrative system 1002 or the client 1016 to detect user interaction such as a "click" on an icon and/or translation of a cursor.

The administrative system 1002 or client 1016 typically may include one or more output devices 1068. Examples of different kinds of output devices 1068 include displays, projectors, speakers, tactile devices, network cards, wireless transmitters, infrared transmitters, lights, etc. The output device 1068 may output, transmit, send, display, project, emit and/or convey information to another device and/or to a user of the administrative system 1002 or client 1016. For instance, the output device 1068 may be a monitor that can display information (e.g., images) to a user. In another example, the output device 1068 may be a network card that can transmit information to another computing device connected to a network. In some configurations, the output device 1068 may display a graphical user interface (GUI) to facilitate user interaction. For example, the client 1016 may display a window with icons that a user may interact with using a keyboard and/or mouse (e.g., "keyboard/mouse").

One specific type of output device that may typically be included in a administrative system 1002 or client 1016 is a display device 1070. Display devices 1070 used with configurations disclosed herein may utilize any suitable image projection technology, such as a cathode ray tube (CRT), liquid crystal display (LCD), light-emitting diode (LED), gas plasma, electroluminescence or the like. A display controller 1072 may also be provided for converting data 1060a stored in the memory 1056 into text, graphics and/or moving images (as appropriate) shown on the display device 1070. FIG. 10 illustrates only one possible configuration of an administrative system 1002 or client 1016. Various other architectures and components may be utilized.

In the above description, reference numbers have sometimes been used in connection with various terms. Where a term is used in connection with a reference number, this may refer to a specific element that is shown in one or more of the figures. Where a term is used without a reference number, this may refer generally to the term without limitation to any particular figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of non-transitory computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be non-transitory and tangible.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A computing device configured to forward a request, comprising:
   a processor;
   memory in electronic communication with the processor;
   instructions stored in the memory, the instructions being executable to:
      receive a request, at a local proxy on the computing device, from one of multiple agent modules on the computing device, wherein the request indicates a request for service from one of multiple administrative services, wherein the request is addressed to the local proxy;
      identify, in a Uniform Resource Locator (URL) in the request, a name of the administrative service and a name of a function provided by the agent module;
      identify the agent module on the computing device based on the name of the administrative service and the name of the function in the URL;
      determine the administrative service based on the identified agent module;
      forward the request to the administrative service, wherein the request comprises a request for an update to an application on the computing device, and wherein the administrative service is on an administrative computing device in electronic communication with the computing device via a computer network; and
      send a reply to the identified agent module.

2. The computing device of claim 1, wherein identifying the agent module and determining the administrative service is performed by a service on the computing device.

3. The computing device of claim 2, wherein the service is dynamically updated.

4. The computing device of claim 1, wherein the request comprises a parameter that indicates the agent module sending the request.

5. The computing device of claim 4, wherein the parameter is a user agent field.

6. The computing device of claim 1, wherein forwarding the request comprises sending data to the administrative service.

7. The computing device of claim 6, wherein forwarding the request further comprises sending the data to a storage device with instructions to later send the data to the administrative service.

8. The computing device of claim 1, wherein the instructions are further executable to receive a plurality of requests.

9. A method for forwarding a request on a computing device, comprising:
   receiving a request, at a local proxy on the computing device, from one of multiple agent modules on the computing device, wherein the request indicates a request for service from one of multiple administrative services, wherein the request is addressed to the local proxy;
   identifying, in a Uniform Resource Locator (URL) in the request, a name of the administrative service and a name of a function provided by the agent module;
   identifying the agent module on the computing device based on the name of the administrative service and the name of the function in the URL;
   determining the administrative service based on the identified agent module;
   forwarding the request to the administrative service, wherein the request comprises a request for an update to an application on the computing device, and wherein the administrative service is on an administrative computing device in electronic communication with the computing device via a computer network; and
   sending a reply to the identified agent module.

10. The method of claim 9, wherein identifying the agent module and determining the administrative service is performed by a service on the computing device.

11. The method of claim 10, wherein the service is dynamically updated.

12. The method of claim 9, wherein the request comprises a parameter that indicates the agent module sending the request.

13. The method of claim 12, wherein the parameter is a user agent field.

14. The method of claim 9, wherein forwarding the request comprises sending data to the administrative service.

15. The method of claim 14, wherein forwarding the request further comprises sending the data to a storage device with instructions to later send the data to the administrative service.

16. The method of claim 9, further comprising receiving a plurality of requests.

17. A non-transitory computer-readable medium for forwarding a request, comprising executable instructions for:
   receiving a request, at a local proxy on a computing device, from one of multiple agent modules on the computing device, wherein the request indicates a request for service from one of multiple administrative services, wherein the request is addressed to the local proxy;
   identifying, in a Uniform Resource Locator (URL) in the request, a name of the administrative service and a name of a function provided by the agent module;
   identifying the agent module on the computing device based on the name of the administrative service and the name of the function in the URL;
   determining the administrative service based on the identified agent module;
   forwarding the request to the administrative service, wherein the request comprises a request for an update to an application on the computing device, and wherein the administrative service is on an administrative computing device in electronic communication with the computing device via a computer network; and
   sending a reply to the identified agent module.

18. The computer-readable medium of claim 17, further comprising executable instructions for receiving a plurality of requests.

* * * * *